June 25, 1929. C. H. HAPGOOD 1,718,690
INTERMITTENT ABSORPTION REFRIGERATING APPARATUS
Filed Oct. 14, 1925 4 Sheets-Sheet 1

INVENTOR
Cyrus H. Hapgood
BY
Albert M. Austin
HIS ATTORNEY

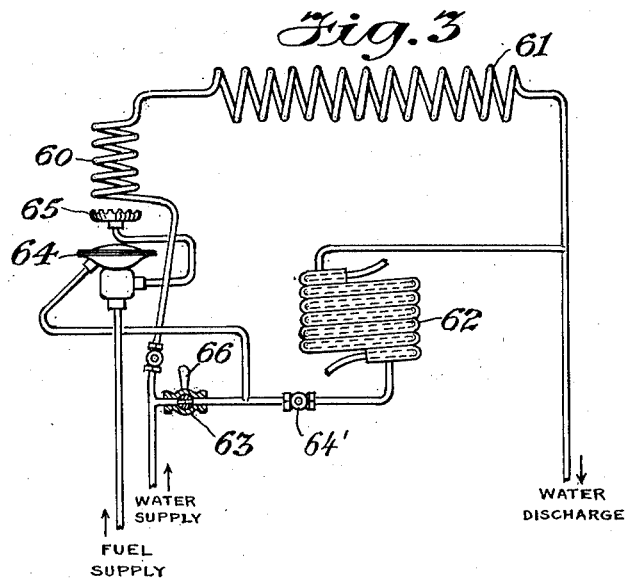
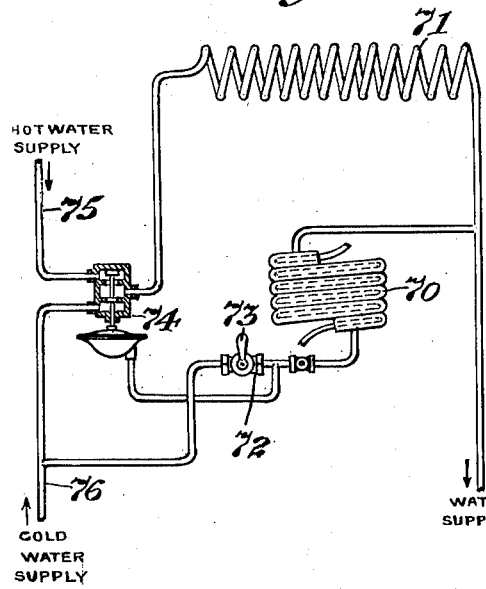
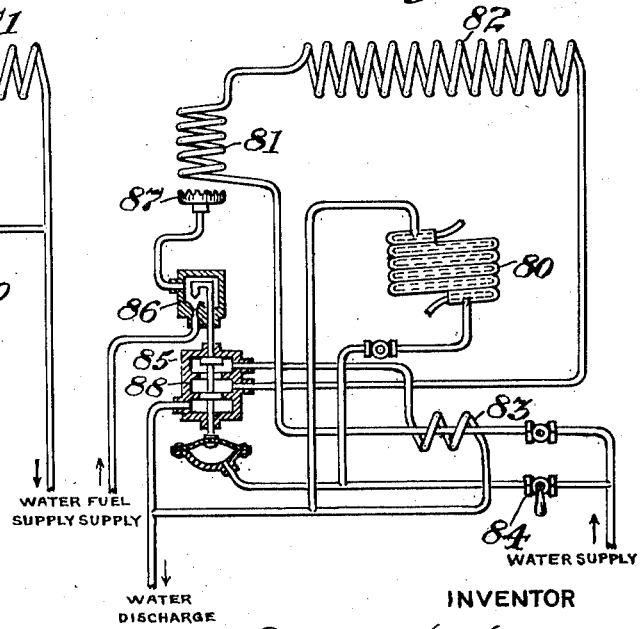

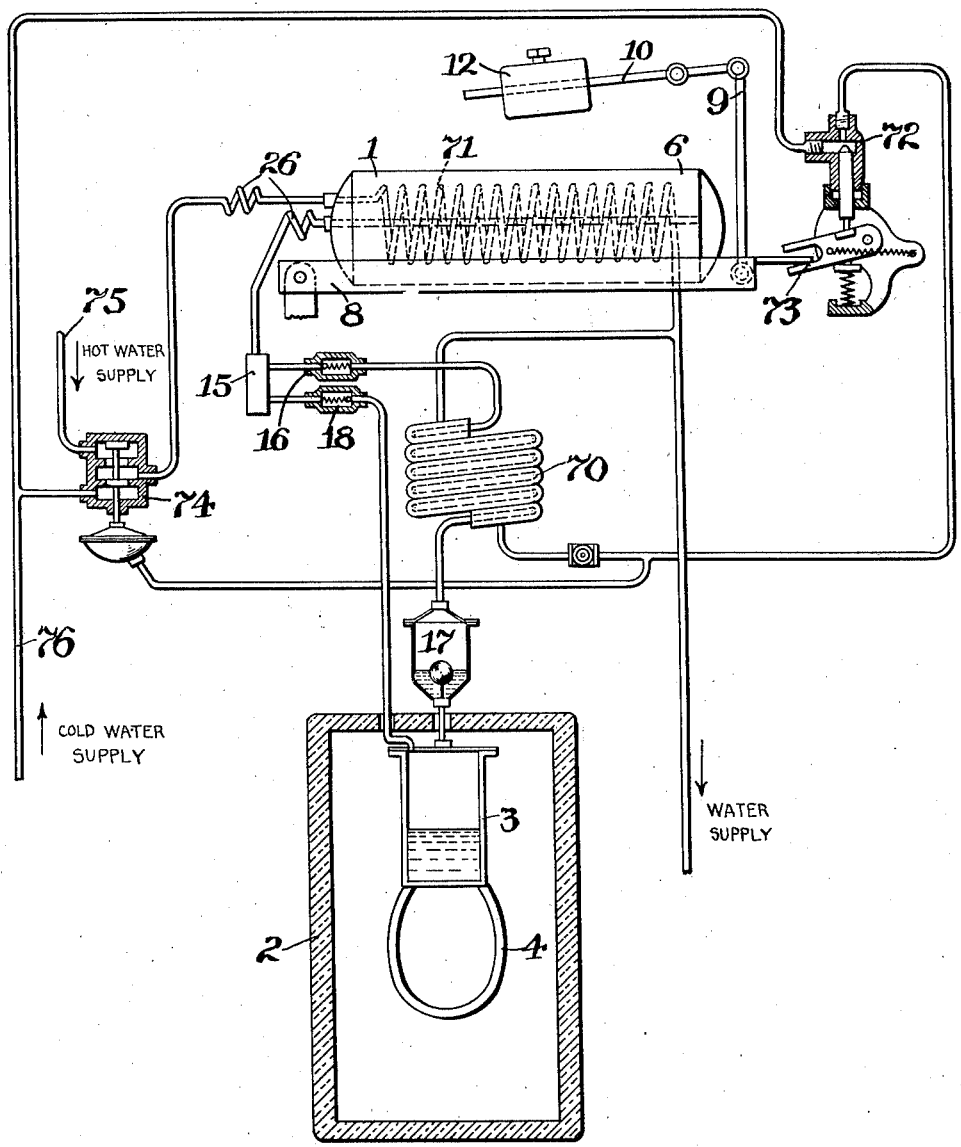

Patented June 25, 1929.

1,718,690

UNITED STATES PATENT OFFICE.

CYRUS H. HAPGOOD, OF NUTLEY, NEW JERSEY.

INTERMITTENT-ABSORPTION REFRIGERATING APPARATUS.

Application filed October 14, 1925. Serial No. 62,360.

This invention relates to refrigerating apparatus and more particularly to refrigerating apparatus of the intermittent absorption type.

The invention relates to an arrangement for cooling and heating the various parts of the apparatus and particularly the absorption chamber and the condenser.

A feature of the invention is the provision of a continuous flow of heat exchange fluid such as water through the absorption chamber, the temperature of the fluid being changed for the absorption and generating periods. A further feature of the invention is the provision of an intermittent flow through the absorption chamber of hot water during the generating period and cold water during the absorption period. To carry out the above provisions the condenser may be arranged in series with the heat exchange coil in the absorption chamber, the condenser acting as a booster during the generating period to pre-heat the water. Another feature of the invention is the provision of a separate booster arranged in series with the heating coil to pre-heat water during the generating period.

The invention also provides for a parallel arrangement of the condenser with respect to the heating coil used for heating the water and heat absorption coil. Devices may be provided whereby during the absorption period the water flow to the condenser is stopped at the same time the heat supply is removed from the heating coil.

A further feature of the invention is the primary control of the water flow, the supply of fuel used for the heating devices depending upon the water pressure.

Still another feature of the invention is the provision of devices whereby the different events in the refrigerating cycle may be controlled by the amount of refrigerant in the absorption chamber. The different events may also be controlled by the amount of refrigerant in the boiler causing the boiler to assume different positions.

Various other objects and advantages of the invention will be obvious from the following particular description of different forms of devices embodying the invention or from an inspection of the accompanying drawings; and the invention also consists in certain new and novel features of construction and combinations of parts hereinafter set forth and claimed.

In the accompanying drawings I have shown for purposes of illustration one form of device with certain modifications thereof embodying the invention, in which—

Fig. 3 illustrates, for simplicity, merely the water system of the same type refrigerating apparatus as in the previous figures, the condenser being in parallel with the heating and heat exchange coils, the gas burner for the heating coil being controlled by the water supply pressure;

Fig. 4 illustrates, for simplicity, merely the water system of the same type of refrigerating apparatus as in the previous figures, the system being arranged to obtain hot water from the hot water system of the place where the refrigerating apparatus is used;

Figure 1:
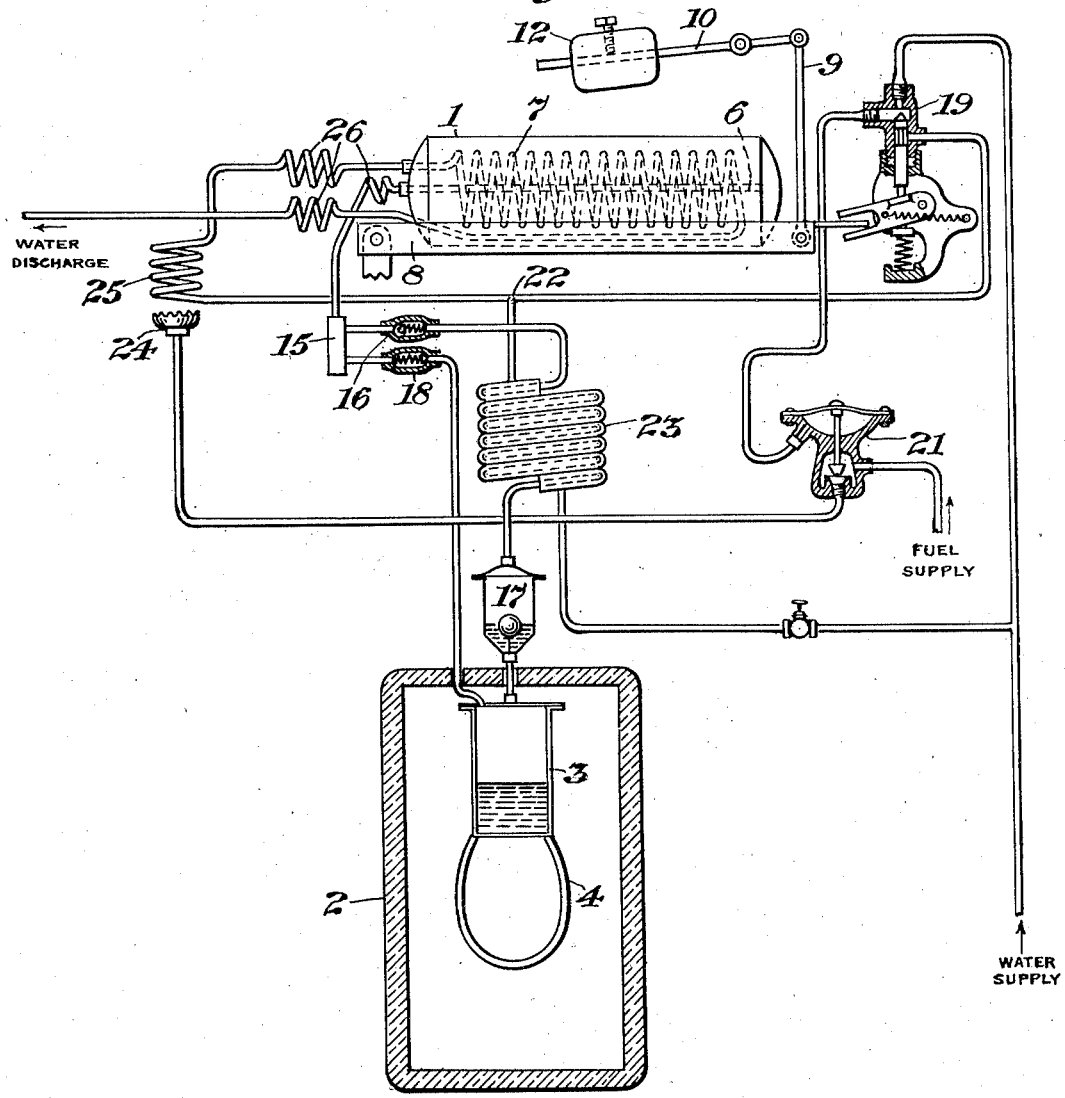
Fig. 1 illustrates a refrigerating apparatus of the intermittent absorption type, the different events being controlled by the amount of refrigerant in the absorption chamber and the condenser being in series with the heating coil and heat exchange coil.

Fig. 5 illustrates the water system of refrigerating apparatus of the same type as in the previous figures, the condenser being in parallel with the heating coil and heat exchange coil, an auxiliary booster being arranged in series with the heating coil for pre-heating the water by the water discharge from the heat exchange coil; and Fig. 6 illustrates a water supply system of the type shown in Fig. 4 applied to the refrigerating apparatus of the type shown in Fig. 1.

In the following description and in the claims parts will be identified by specific names for convenience, but they are intended to be as generic in their application to similar parts as the art will permit.

In the following description a number of species of the same type of refrigerating apparatus are described but with different heat exchange or water systems. All of the species of apparatus are of the flooded type, that is, the type which does not use an expansion valve but which injects or feeds liquid refrigerant in successive charges to the boiler. These charges accumulate in the boiler and remain there until drawn out by creating a zone of pressure lower than that of the refrigerator and connecting the refrigerator to said zone through a check valve whereupon the liquid freely boils and absorbs heat from the refrigerator and thereby provides the necessary refrigeration effect. The condensers used in the following illustrations may be of any desired type and are preferably connected up counter-flow, that is, the refrigerant flows generally in the opposite direction to that of the cooling liquid. The absorption substance employed may be of any desired kind which will easily absorb the particular refrigerant used such as silica jel or other absorbent such as are well known in the art. Although the particular types shown for purposes of illustration are flooded systems, it will be understood that the invention is applicable to other systems.

Referring now to Fig. 1 of the drawings, the absorption chamber is denoted by 1. The refrigerator is denoted by 2 and may contain the boiler or refrigerating chamber 3 having suitable cooling coils 4. The absorption chamber 1 may be filled with a suitable absorption substance 5 such as silica jel and may have disposed therein a pipe 6 suitably perforated to exclude the absorption substance but to allow free passage of the refrigerant as it is absorbed and given off by the absorption substance. The absorption chamber may also have a heat exchange coil 7 through which heat exchange fluid such as water is adapted to flow, as will be explained more in detail hereinafter.

The absorption chamber 1 may be supported by a suitable support 8 pivoted at one end and suspended at the other by a link 9 which in turn is attached to one end of a lever 10 pivoted between its ends, and having a suitable weight 12 at the other end. The absorption chamber 1 may have a limited movement up and down, the chamber being shown in its lower position which it has attained on account of the absorption substance having absorbed a predetermined amount of refrigerant. It will be understood that when the absorption substance drives off or generates a predetermined amount of refrigerant, it will assume the upper position. The perforated pipe 6 may be connected to a header 15 to which may be connected two pipes leading to the boiler 3. In one pipe may be located a check valve 16 which is so positioned that a greater pressure in the absorption chamber 1 than in the boiler 3 opens the check valve. Also positioned in this pipe may be a ball float chamber 17 which closes the entrance to the boiler 3 when no liquid refrigerant is present in the ball float chamber 17. In the other pipe may be a check valve 18 which can only open when the pressure in the absorption chamber 1 is less than the pressure in the boiler 3.

The heat exchange system will now be described in detail. A control valve 19 may be provided which may be operated by the position of the absorption chamber 1. This control valve has three openings, one of which extends to the water supply. Another extends to a pressure operated fuel supply valve 21 and the other extends to a point 22 of reduced pressure such as the outlet of the condenser 23. In the position shown the plunger of the valve 19 allows the water pressure to be communicated to the pressure controlled fuel supply valve 21, this supply valve allowing fuel such as gas to be supplied to the burner 24 which heats the heating coil 25. The other position of the valve 19 is obtained when the absorption chamber 1 is in its upper position. When the valve is in this position the plunger closes the communication between the water supply and the fuel valve 21 and allows the fuel valve to be communicated with the point 22 of reduced pressure to allow the fuel valve 21 to close.

The inlet to the condenser 23 may be connected to the water supply, the outlet being connected to the heating coil 25, the heating coil being connected to the heat exchange coil 7, the other end of the heat exchange coil being connected to the discharge. It will be understood that suitable resilient coils 26 will be placed in all pipes leading to the absorption chamber 1 to take care of the relative movement of the absorption chamber with respect to the rest of the system.

The operation of the apparatus shown in Fig. 1 may be as follows. Starting with the condition shown, the absorption chamber has already absorbed a predetermined amount of refrigerant. This has caused the chamber to assume its lowermost position operating the control valve 19 to allow water pressure to open the fuel supply valve 21 which in turn allows fuel to be supplied to the burner 24 which may be ignited by suitable pilot, the burner heating the heating coil 25 through which the water continuously flows first passing, of course, through the condenser 23. The water passing through the heat exchange coil 7 will be of sufficient temperature to cause the absorption material to drive off or generate the refrigerant. This refrigerant which will be driven off with sufficient pressure to open the check valve 16 will be condensed as it passes through the condenser 23, the condensed refrigerant entering the float valve chamber 17, raising the float valve and allowing liquid refrigerant to enter the boiler 3. The pressure of the gaseous refrigerant generated by the absorption chamber 1 will be regulated by the temperature of the cold water flowing through the condenser 23. Boiling the liquid refrigerant, it will be understood, causes the heat to be absorbed from the refrigerator giving the desired cooling effect.

When sufficient refrigerant has been driven off from the absorption material the absorption chamber will become sufficiently light to allow the weight 12 to cause the chamber 1 to assume its upper position, thereby operating the control valve 19 and closing communication between the water supply and fuel supply valve 21 and opening the fuel supply valve to the point 22 of reduced pressure as explained above. This causes the burner 24 to cease heating the water which continuously flows through the heating coil 25, the water being now cold when it enters the heat exchange coil 7, this causing the absorption material to absorb the refrigerant, thus beginning the absorption period. The pressure in the absorption chamber will now be less than that in the boiler allowing the check valve 18 to open and the gaseous refrigerant to be absorbed from the boiler. Refrigerant will be vaporized by heat from the refrigerator and its contents and the vaporization may be intermittent or continuous. The absorption period of course will continue until a predetermined amount of refrigerant has been absorbed sufficient to cause the absorption chamber to become heavy enough to assume its lower position when the cycle will be repeated.

It will be seen that the supply of water through the heat exchange coil 7 is continuous, its temperature merely being changed according to the period of the cycle. During the generating period the water is preheated in the condenser 23 by its cooling action on the refrigerant, thereby providing the advantage that the heating coil 25 does not have to heat the water to as great an extent to provide water of a given temperature to the heat exchange coil 7. During an absorption period there is no refrigerant flowing through the condenser 23, the water flowing therethrough having no appreciable change in its temperature.

Figure 2:
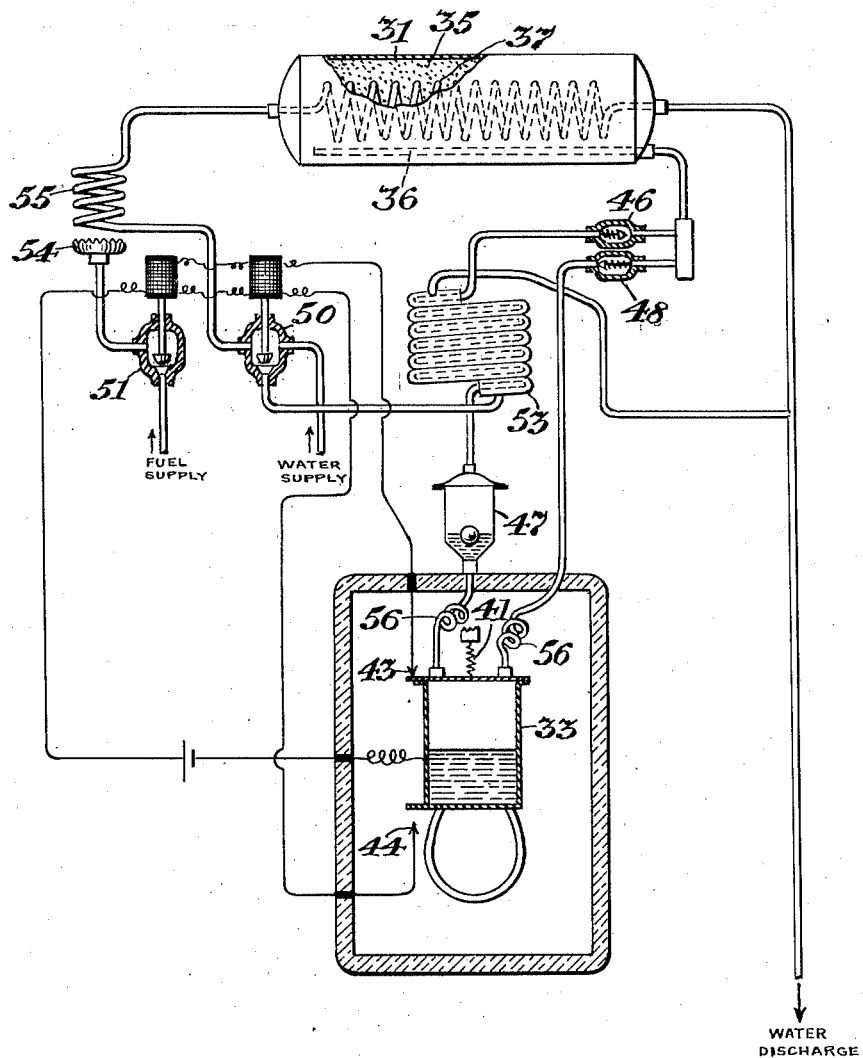
Fig. 2 illustrates the same type of refrigerating apparatus as Fig. 1, the different events being controlled by the amount of refrigerant in the boiler. In this case the condenser is in parallel to the heating and heat exchange coils.

Now referring to Fig. 2, the absorption chamber 31 is shown having a heat exchange coil 37 having a perforated pipe 36 and filled with suitable absorption material 35, as in Fig. 1. In this species, however, the absorption chamber 31 may be rigidly mounted. The boiler 33 in this species may be mounted by a spring 41 to provide a resilient mounting allowing the boiler 33 to have a certain amount of vertical movement. Suitable piping may be arranged between the perforated pipe 36 and the boiler 33 having check valves 46 and 48, a condenser 53 and a ball float chamber 47 as in Fig. 1. In order to take up the difference in position caused by the movement of the boiler 33 suitable resilient coils of pipe 56 may be provided. In this species the heating coil 55 may be connected in series with the heat exchange coil 37, these coils being connected in parallel with the condenser 53. Water may be allowed to circulate through the heat exchange coil 37 continuously. The circulation through the condenser 53, however, is controlled by a solenoid-operated water supply valve 50. The water supply valve is operated by the position of the boiler 33 through suitable contacts, the position of the boiler also controlling the solenoid-operated fuel supply valve 51 supplying fuel to the burner 54, the two windings of the double-acting solenoid being operated respectively by contacts 43 and 44 to open or close the valves associated therewith, in accordance with the position of cylinder 33.

In this species the position of the various parts of apparatus illustrated is that which will be assumed during a generating period. The upper contact 43 is closed, causing both the water supply valve 50 and the fuel supply valve 51 to be opened thereby causing hot water to be circulated through heat exchange coil 37 and cold water through the condenser 53. When a predetermined amount of refrigerant has been driven off or generated from the absorption material and passed into the boiler 33, the boiler will become sufficiently heavy to break the upper contact 43 and make the lower contact 44, thereby causing the water supply valve 50 to shut off the water supply to the condenser 53 and the fuel supply valve 51 to shut off fuel supply to the burner 54, thereby causing cold water to flow through the heat exchange coil 37 and no water at all through the condenser 53.

Referring now to Fig. 3, there is shown the heat exchange system of refrigerating apparatus of the same type as that shown in Figs. 1 and 2. In this species the heating coil 60 and heat exchange coil 61 may be connected in series with the water supply, the condenser 62 being connected in parallel to the heating coil and heat exchange coil. The control valve 63 which may be operated by any element 66 in the refrigerating apparatus which is responsive to change of events in the refrigerating cycle, such as the absorption chamber in Fig. 1 or the boiler in Fig. 2, may be placed in the condenser line. Between the control valve 63 and the condenser 62 may be connected the pressure element of a pressure operated fuel supply valve 64 which supplies fuel to the burner 65 for heating the heating coil 60, and a valve $64^1$ may be provided for regulating the pressure on the said element to a critical operating pressure.

The position of the several parts of the apparatus shown is such as is assumed by them during the generating period. The control valve 63 is open allowing water to circulate through the condenser 62 and allowing pressure to be communicated to the pressure controlled fuel supply valve 64 thereby allowing the burner 65 to heat the heating coil 60 causing hot water to be supplied to the heat exchange coil 61. After a predetermined amount of refrigerant is generated or given off from the absorption chamber the control valve 63 will be closed by the element 66 suitably automatically operated, as above described, thereby closing off the water supply to the condenser 62 and the pressure supply to the fuel supply valve 64 thereby causing the burner 65 to be extinguished and allowing cold water to flow through the heat exchange coil 61 causing the occurrence of an absorption period. This construction has the advantage that only one valve 63 need be controlled by the control element 66, the flow of water through the condenser 62 automatically determining whether or not the water supplied to the heat exchange coil 61 should be hot or cold.

Referring now to Fig. 4, this figure shows a different heat exchange system for the same type of refrigerating apparatus shown in previous figures. This construction is for use where the situation of the refrigerating apparatus is such that a hot water system can be easily tapped. The condenser 70 is shown connected in parallel to the heat exchange coil 71, the control valve 72 being connected in the condenser line as in Fig. 3. This control valve 72 may be operated by any suitable element 73 in the refrigerating apparatus and its function is to both control the supply of water to the condenser 70 and thereby control the pressure to the pressure operated two-way valve 74. The element 73 may be controlled by any element responsive to change of events in the refrigerating cycle as the absorption chamber in Fig. 1 or the boiler in Fig. 2. The pressure operated two-way valve 74 is arranged so that when in one position it allows the hot water supply pipe 75 to be connected to the heat exchange coil 71 and when in any other position it allows the cold water supply pipe 76 to be connected to the heat exchange coil 71.

The position of the several parts of the apparatus shown is such as will be assumed during a generating period. The control valve 72 is open allowing cold water to circulate through the condenser 70 and allowing pressure to operate the two-way valve 74 to its upper position thereby allowing hot water to flow through the heat exchange coil 71. After a predetermined amount of refrigerant has been driven off from the absorption chamber the control valve 72 will be closed by the element 73 and the water supply to the condenser 70 will be stopped and also the pressure on the two-way valve 74 will be reduced, thereby causing the cold water supply pipe 76 to be connected to the heat exchange coil 71 causing the recurrence of an absorption period. It will easily be appreciated that the great advantage of this construction is that it may be used in a house or other place which has a continuous hot water and cold water supply without the use of any extra fuel supply pipe.

Fig. 6 shows the above described water supply system, such as that set forth in Fig. 4 and the method for incorporating this system in the refrigerating apparatus shown in Fig. 1. The various portions of the water supply system are identical with those in Fig. 4 and have been given the same reference numerals. The absorption apparatus is identical with that shown in Fig. 1, and has been given reference numerals corresponding thereto. The operation of the system of Fig. 6 may therefore be understood by referring to the descriptions of Figs. 1 and 4.

Referring now to Fig. 5 there is shown still another heat exchange system for refrigerating apparatus of the same type as in the previous figures. The condenser 80 in this case may be connected in parallel with the heating coil 81 and heat exchange coil 82 as in Fig. 3. In this case, however, a booster 83 may be provided between the water supply and the heating coil 81. A control valve 84 may be provided between the water supply and condenser 80 which will be operated by a suitable element in the refrigerating apparatus which is responsive to change of events in the refrigerating cycle. A pressure operated compound valve 85 may be connected to a point between the control valve 84 and the condenser 80. This compound valve 85 is composed of a fuel supply valve 86 which supplies fuel to the burner 87 for heating the heating coil 81, and a two-way valve 88 which selectively causes the outlet of the heat exchange coil 82 to be communicated either directly to the discharge or to the booster 83 and thence to the discharge.

The position of the several parts of the apparatus illustrated is such as will be assumed during the generating period. The control valve 84 is open allowing water to circulate through the condenser 80 and allowing pressure to open the fuel supply valve 86 and to move the two-way valve to its upper position connecting the outlet of the heat exchange coil 82 to the booster 83. The warm water leaving the heat exchange coil instead of being thrown away directly into the discharge is allowed to circulate through the booster 83 thereby pre-heating the water supplied to the heating coil 81 effecting a saving of heat.

When sufficient refrigerant has been driven off from the absorption chamber the control valve 84 will be closed, thereby stopping the circulation of water through the condenser 80 and relieving the pressure on the pressure controlled compound valve 85 thereby closing the fuel supply valve 86 and extinguishing the burner 87 and causing the two-way valve 88 to assume its lower position in which the outlet of the heat exchange coil 82 is connected directly to the discharge, this causing the beginning of an absorption period.

In all of the modifications above described the heating medium is hot water which is supplied by heating cold water by a fuel such as gas which is comparatively cheap, or which is supplied directly from the hot water supply system of the place in which the apparatus is used. In all of the modifications the flow of water through the heat exchange coil is substantially continuous, the temperature of the water merely being changed to change from a generating period to an absorption period. Thus it will be seen the apparatus according to the invention can be operated very cheaply and efficiently. The heat may be supplied from gas which is cheap as regards cost of heat and easily controlled, or from other fuel such as oil, or from electric current.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

Having described my invention, I claim:

1. In refrigerating apparatus of the intermittent absorption type, an absorption chamber, a condenser, a refrigerating chamber, and devices for periodically causing the refrigerant to be generated, condensed, boiled, and absorbed, including a heat exchange conduit associated with said absorption chamber, and means controlled by the weight of heat exchange fluid in a portion of said apparatus for alternately first causing a simultaneous flow of heating fluid thru said conduit and of cooling fluid thru said condenser and then causing a flow of cooling fluid thru said conduit.

2. In refrigerating apparatus of the intermittent absorption type, an absorption chamber, a condenser, a refrigerating chamber, and devices for periodically causing the refrigerant to be generated, condensed, boiled, and absorbed including a heat exchange conduit associated with said absorption chamber, a source of heat exchange fluid, an element movable in accordance with given amounts of refrigerant in said absorption chamber, a control valve operable by said element between said source and condenser, a pressure operated valve for controlling the temperature of the heat exchange fluid connected between said control valve and condenser.

3. In refrigerating apparatus of the intermittent absorption type, an absorption chamber, a condenser, a refrigerating chamber, and devices for periodically causing the refrigerant to be generated, condensed, boiled, and absorbed, including a condenser between said absorption chamber and refrigerating chamber, a heat exchange conduit associated with said absorption chamber, a continuous source of hot water, a continuous source of cold water, and means responsive to change in condition of the apparatus for causing hot water to flow to said conduit and cold water to flow to said condenser during a generating period, and cold water to flow to said conduit and no water to said condenser during an absorption period.

4. In refrigerating apparatus of the intermittent absorption type, an absorption chamber, a condenser, a refrigerating chamber, and devices for periodcally causing the refrigerant to be generated, condensed, boiled and absorbed, including a condenser between said absorption chamber and refrigerating chamber, a heat exchange conduit associated with said absorption chamber, a source of hot water, a source of cold water, a two-way valve for connecting either of said sources to said conduit, a control water valve, conduits to allow water to flow from said source of cold water serially thru said control valve and condenser in parallel to said two-way valve and heat exchange coil, and means for operating said valves by an element responsive to change in condition of the apparatus so that said two-way valve allows hot water to flow to said conduit when said control valve is open and cold water to flow to said conduit when said control valve is closed.

5. In refrigerating apparatus of the intermittent absorption type, an absorption chamber, a condenser, a refrigerating chamber, and devices for periodically causing the refrigerant to be generated, condensed, boiled and absorbed, including a condenser between said absorption chamber and refrigerating chamber, a heat exchange conduit associated with said absorption chamber, a source of hot water, a source of cold water, a pressure controlled two-way valve for connecting either of said sources to said conduit, a control water valve operable by an element responsive to change in condition of the apparatus, conduits to allow water to flow from said source of cold water serially thru said control valve and condenser in parallel to said two-way valve and heat exchange conduit, said two-way valve being connected between said control valve and condenser, said two-way valve allowing hot water to flow to said exchange conduit when said control valve is open and cold water to flow to said exchange conduit when said control valve is closed.

6. In a refrigerating apparatus of the absorption type having an absorption chamber and a condenser, means for periodically causing the refrigerant to be generated, condensed, boiled and absorbed, comprising means for passing cooling fluid through said condenser, a control valve for said fluid, means for operating said valve in accordance with the weight of heat exchange fluid in said absorption chamber, and means controlled by the pressure of fluid applied to said condenser for regulating the heat of said absorption chamber.

In testimony whereof I have hereunto set my hand.

CYRUS H. HAPGOOD.